May 13, 1924.
L. M. ASPINWALL
BRAKING SYSTEM
Filed Nov. 2, 1920
1,493,837
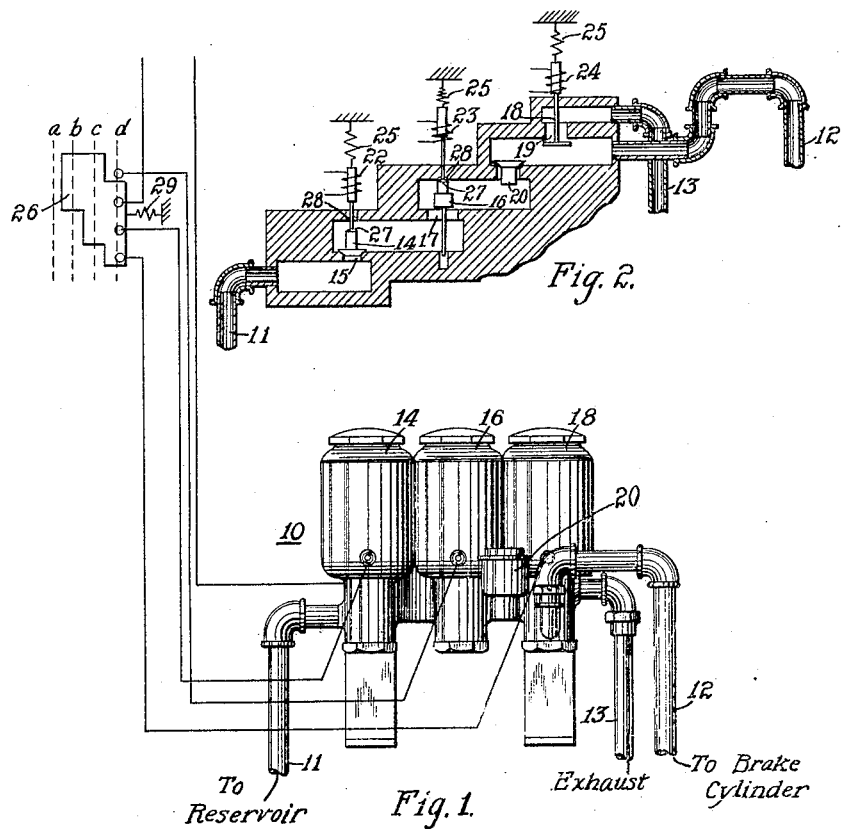
WITNESSES:
INVENTOR
Louis M. Aspinwall
BY
ATTORNEY Patented May 13, 1924.

1,493,837

UNITED STATES PATENT OFFICE.

LOUIS M. ASPINWALL, OF PITTSBURGH, PENNSYLVANIA, ASSIGNOR TO WESTINGHOUSE ELECTRIC & MANUFACTURING COMPANY, A CORPORATION OF PENNSYLVANIA.

BRAKING SYSTEM.

Application filed November 2, 1920. Serial No. 421,228.

*To all whom it may concern:*

Be it known that I, LOUIS M. ASPINWALL, a citizen of the United States, and a resident of Pittsburgh, in the county of Allegheny and State of Pennsylvania, have invented a new and useful Improvement in Braking Systems, of which the following is a specification.

My invention relates to fluid-pressure braking systems, and it has particular relation to the electrical control thereof.

One object of my invention is to provide a highly simplified manifold arrangement of the control valves between the air reservoir and the brake cylinder.

Another object of my invention is to electrically control these valves and to so arrange them in circuit that, when all of said valves are de-energized, an emergency or full application of air pressure is delivered to the brake cylinder.

A further object of my invention is to so arrange the windings of the electromagnetic control devices that they are located outside of the channel through which the compressed air is delivered to the brake cylinder.

Another object of my invention is to prevent leakage of compressed air from the valve manifold, particularly when it is desired to maintain air pressure in the brake cylinder.

My invention, therefore, contemplates arranging the control valves in series relation with each other in a continuous channel between the air reservoir and the brake cylinder; and to extend each valve stem outside said channel so that the windings of the electromagnets acting thereupon will also be located outside of this channel. The windings will, accordingly, be free from the air pressure, rendering it unnecessary to provide air-tight casings for these windings. Each valve is provided with suitable means for returning it from the energized position after the coil of the electromagnet has been de-energized. A check valve is arranged in series relation between the operating valves to co-operate therewith to prevent leakage of air from the manifold to the atmosphere when the controller is in the so-called "lap" position.

My invention may best be understood by reference to the accompanying drawing, wherein—

Figure 1 is a diagrammatic view of control circuits and apparatus embodying my invention; and Fig. 2 is a view in longitudinal cross-section through the air-valve manifold.

In the accompanying drawing, all unnecessary apparatus and circuits have been eliminated to simplify the illustration and more clearly bring out the features of the present invention.

Referring to Fig. 1, an air-valve manifold 10 is shown having a pipe 11 communicating with an air reservoir (not shown), a pipe 12 communicating with a brake cylinder (not shown), and a pipe 13 communicating with the atmosphere. Governing valves 14, 16 and 18, and check valve 20 are located between the air reservoir and brake cylinder, said valves being electrically controlled and having a controller 26 in the circuits for said valves.

Referring to Fig. 2, valve 14 is shown closing port 15 leading from the air reservoir. A port 17, communicating with the port 15, is shown in conjunction with valve 16, which is adjustable therein to regulate the size of the port 17 to control the rate of flow of air pressure delivered to the brake cylinder. An exhaust valve 18 closes port 19 leading to the atmosphere, and located between valves 16 and 18, is a check valve 20, the function of which is to prevent leakage of compressed air back from the brake cylinder past the valve stems of valves 14 and 16 during the time when it is desired to maintain the air pressure in the brake cylinder, this operation being hereinaftter more fully described.

It will be noted that the control valves 14, 16, 20 and 18 are arranged in series relation with each other in the order named, and it is, therefore, possible to provide a single, continuous channel for the compressed air, in a compact manifold.

To use familiar terms, valve 14 may be called the "brake application" valve; valve 16, the "emergency" valve; and valve 18, the "brake release" or "exhaust" valve.

The stems of the valves 14, 16 and 18 extend outside of the air channel, and are shown equipped with electromagnetic coils 22, 23 and 24, respectively. Each valve stem also has connected thereto means, conventionally shown as a spring 25, for actuating it from the position occupied when the respective coils are energized. Any other well known, quickly responsive, method of returning these valves may be employed.

The heads of the valves 14 and 16 are provided with convex portions 27, respectively, each portion 27 being adapted to fit snugly in a concave seat 28 located in the valve manifold. When the valves 14 and 16 are raised or opened, the snug fit of portions 27 in their respective seats 28 insures a minimum leakage of compressed air past these valve stems in its passage from the reservoir to the brake cylinder.

A controller 26 has four operative positions $a$, $b$, $c$, and $d$, corresponding, respectively, to the well-known emergency, service, lap and release positions of a brake controller. The circuit connections between the respective coils of the valves 14, 16 and 18 and the contact members of the controller 26 are apparent from Fig. 1; and, therefore, it will suffice here to describe the movements of the various valves in the different positions of the controller 26.

The controller is shown in position $d$, which is the so-called release position. In this position, in the present illustration, the coil of the emergency valve 16 is de-energized and, therefore, it occupies the position shown in Fig. 2. At the same time, the coils of valves 14 and 18 are energized, closing valve 14 and opening valve 18, as shown in Fig. 2. Accordingly, the brake cylinder is opened to the atmosphere, thereby releasing the brakes, and the port 15 to the reservoir is maintained closed by the valve 14.

If the motorman desires to make a "service" application of the brakes, the controller handle is moved to the position $b$, whereupon the coil 23 becomes energized, moving the emergency valve 16 to partially close the port 17 to provide a restricted path for the compressed air. At the same time, coils 22 and 24 are de-energized, thus opening brake application valve 14 and closing exhaust valve 18, respectively, by the action of the springs 25.

As is well understood, the motorman cannot leave the controller in the service application position without causing the vehicle to stop sharply. Therefore, a "lap" or hold position, designated by the letter $c$, is provided for the controller handle, in which position the coil 23 is maintained energized and, in addition, the coil 22 is energized to temporarily close the brake application valve 14.

At this time, it is desirable to maintain all of the accumulated air pressure in the brake cylinder, and to have no passage or path of leakage to the atmosphere. Such paths would be established around the stems of valves 14 and 16 if the check valve 20 were not inserted between the release and the emergency valves. The coil of the release valve being de-energized, it is maintained closed; and the check valve 20 closes the channel to the brake application valve. Accordingly, the pressure in the brake cylinder will be maintained until valve 18 is opened.

By manipulation of the controller between the service and lap positions, the motorman can effect the desired gradual stopping of the vehicle, as is customary practice.

However, at times, it becomes necessary to make an "emergency" application of the brakes to cause the vehicle to stop immediately. In the present invention, this is accomplished by moving the controller to the position $a$, Fig. 1, whereupon each of the valves 22, 23 and 24, is de-energized. Accordingly, the springs 25 will raise each of the valves 14, 16 and 18, thereby opening valve 14, moving valve 16 to its uppermost position to give an unrestricted opening for the passage of the air to the brake cylinder, and closing the valve 18 to the atmosphere. This "emergency" application of air will continue so long as the controller is kept in the position $a$.

The controller 26 is conventionally shown as equipped with a spring 29 tending to continually pull it to the emergency position. This is the familiar "dead man's release" arrangement which will effect the immediate stoppage of the vehicle should the motorman become suddenly disabled.

From the above description, it will be apparent that the present invention provides a very simple construction, which is accomplished by arranging the controlling valves in series relation with each other, and which eliminates an intricate mass of piping that has heretofore been necessary. The circuit connections between the controller and the electromagnets of the controlling valves have also been greatly simplified so that a minimum amount of material and connections are used.

With these connections, it has been possible to obtain the desirable end of providing an emergency application of air pressure when all of the coils are de-energized. This arrangement effects a speedier application of the emergency pressure and is, therefore, conducive to necessary safety.

I do not wish to be restricted to the specific circuit connections or arrangements of parts herein set forth, as various modifications thereof may be effected without departing from the spirit and scope of my invention. I desire, therefore, that only such limitations shall be imposed as are indicated by the appended claims.

I claim as my invention—

1. In a fluid-pressure braking system, the combination with a plurality of valves arranged in series relation with each other pneumatically and adapted to control the braking, of electrical means for controlling said valves.

2. In a fluid-pressure braking system, the combination with a plurality of valves arranged in series relation with each other pneumatically, each valve being equipped with an electromagnet, of control means for said electromagnets.

3. In a fluid-pressure braking system, the combination with a plurality of separate valves arranged in series relation to respectively determine the application of said pressure and the rate of application thereof, of electrical means for controlling said valves.

4. In a fluid-pressure regulating system located between a supply reservoir and a brake cylinder, the combination with a check-valve and a plurality of other valves arranged in series relation with each other and with said check valve for controlling the pressure delivered from said reservoir to said cylinder, of electrical means for controlling said valves.

5. In a fluid-pressure braking system, the combination with a valve for controlling the application of said pressure, a valve adapted to regulate the rate of flow thereof, and a valve for controlling the exhaust thereof, of a check valve located between said last-mentioned valves and adapted to prevent leakage of air when said application and exhaust valves are both closed, and electrical means for controlling said valves.

6. In a fluid-pressure braking system, the combination with a plurality of valves arranged in series relation with each other to control the braking, of electrical means for controlling said valves adapted to provide a full application of said fluid pressure upon the interruption of the circuits to said electrical means.

7. In a fluid-pressure braking system, the combination of a plurality of valves arranged in series relation with each other for controlling said braking, of electrical means for controlling said valves, adapted to provide a full application of fluid pressure upon the interruption of the electrical circuit to said means.

8. In a fluid-pressure braking system, the combination with an application valve, a regulating valve and a release valve, each of said valves being equipped with an electromagnet, of means for energizing said electromagnets, said valves being so arranged that the control and exhaust valves are simultaneously energized and de-energized to open and close their respective parts in opposite sequence.

9. A fluid-pressure braking system comprising an application valve, a regulating valve and a release valve, said valves being all equipped with electrical means adapted to control the opening and the closing of said valves.

10. A fluid-pressure braking system comprising an application valve, a regulating valve and a release valve, said valves being all equipped with electrical means adapted to control the opening and closing of said valves when properly energized, and adapted to adjust said valves for a full application of pressure when said electrical means are de-energized.

In testimony whereof, I have hereunto subscribed my name this 22nd day of October 1920.

LOUIS M. ASPINWALL.